US011496622B2

(12) United States Patent
Chan

(10) Patent No.: US 11,496,622 B2
(45) Date of Patent: Nov. 8, 2022

(54) METHOD OF CONFIGURING A PRIVATE BRANCH EXCHANGE REMOTELY

(71) Applicant: Charles Lap San Chan, Taipei (TW)

(72) Inventor: Charles Lap San Chan, Taipei (TW)

( * ) Notice: Subject to any disclaimer, the term of this patent is extended or adjusted under 35 U.S.C. 154(b) by 0 days.

(21) Appl. No.: 17/527,557

(22) Filed: Nov. 16, 2021

(65) Prior Publication Data

US 2022/0166873 A1 May 26, 2022

(30) Foreign Application Priority Data

Nov. 23, 2020 (TW) ................................. 109141003

(51) Int. Cl.
*H04M 3/42* (2006.01)
(52) U.S. Cl.
CPC ................................. *H04M 3/4234* (2013.01)
(58) Field of Classification Search
None
See application file for complete search history.

(56) References Cited

U.S. PATENT DOCUMENTS

| 2009/0052650 A1* | 2/2009 | Abramson | H04M 1/724 |
| | | | 379/211.02 |
| 2010/0223494 A1* | 9/2010 | Degenhardt | H04L 65/1053 |
| | | | 714/E11.073 |

\* cited by examiner

*Primary Examiner* — Quynh H Nguyen
(74) *Attorney, Agent, or Firm* — Muncy, Geissler, Olds & Lowe, P.C.

(57) ABSTRACT

In a method of configuring a private branch exchange remotely, a user transmits configuration data to a local private branch exchange via a callable device. The local private branch exchange transmits the configuration data to a remote private branch exchange. Thereby, the user can conveniently configure the private branch exchange configuration or the private branch exchange service of the remote private branch exchange. Besides, the method of configuring a private branch exchange remotely can be applied to private branch exchanges manufactured by different manufacturers as well as private branch exchanges managed by different enterprises or organizations.

13 Claims, 2 Drawing Sheets

METHOD OF CONFIGURING A PRIVATE BRANCH EXCHANGE REMOTELY

This application claims priority of Application No. 109141003 filed in Taiwan on 23 Nov. 2020 under 35 U.S.C. § 119; the entire contents of all of which are hereby incorporated by reference.

BACKGROUND OF THE INVENTION

Field of the Invention

The present invention relates to a method of configuring a private branch exchange remotely, particularly to a method of configuring a private branch exchange remotely via a third-party device.

Description of the Related Art

In modern life, in addition to the exchange of multimedia data such as text, pictures, and images on the data network, the voice communication also has a considerable importance in the communication and contact among people. With the increasing development of Internet speed and bandwidth, many users use Internet voice communication software (such as Skype, Facebook Messenger, Line, etc.) to perform low-cost or even free voice communication.

Generally, common voice communication devices can be divided into users' personal smart phones and desktop phones provided by the enterprise for work. The smart phone is mobile and carried by the user, such that the location of the smart phone can be arbitrarily changed. The smart phones provide users with the advantages of convenient use and use at any time. However, desktop phones provided by enterprises cannot provide mobility, which also causes inconvenience to users. For example, a user waits for an important client call but need to travel to another branch of the enterprise today. Even if some enterprises can configure the phone service to transfer calls to another office, the user may forget to configure the phone service of the original office for some reason. Thus, this service cannot be activated.

In view of the importance of voice communication, especially in business applications, users need to be able to conveniently answer incoming calls from their desktop phones, or further configure phone services of their desktop phones such as do-not-disturb, voice answering machine, dialing for outside lines, etc. How to provide a service that remotely configures a private branch exchange and how to achieve specific services even when a user travels to another enterprise or organization for temporary work but needs to configure the private branch exchanges of the two companies have become a research direction for those skilled in the art.

SUMMARY OF THE INVENTION

The primary objective of the present invention is to provide a method of configuring a private branch exchange remotely, which remotely configures a private branch exchange without limiting the location of a user.

Another objective of the present invention is to provide a method of configuring a private branch exchange remotely, which is applied to private branch exchanges managed by different enterprises or organizations.

To achieve the abovementioned objectives, the present invention provides a method of configuring a private branch exchange remotely, which is employed in an environment of an intermediary host, a first private branch exchange, and a second private branch exchange, the first private branch exchange connected to callable devices, the second private branch exchange connected to callable devices, and the method including:

(A) by the callable device connected to the first private branch exchange, transmitting configuration data to the first private branch exchange;

(B) by the first private branch exchange, transmitting a part of the configuration data to the intermediary host;

(C) by the intermediary host, transmitting data of the second private branch exchange to the first private branch exchange;

(D) by the first private branch exchange, connecting to the second private branch exchange according to the data of the second private branch exchange; and (E) by the first private branch exchange, transmitting the configuration data to the second private branch exchange, wherein the second private branch exchange configures private branch exchange configuration or a private branch exchange service of the second private branch exchange according to the configuration data.

The features, advantages, or similar expressions mentioned in the specification do not mean that all the features and advantages that can be realized by the present invention should be in any single specific embodiment of the present invention. Rather, it should be understood that the expression of related features and advantages means that the specific features, advantages, or characteristics described in conjunction with specific embodiments are included in at least one specific embodiment of the present invention. Therefore, the discussion of features and advantages, and similar expressions in the specification is related to the same specific embodiment, but it is not necessary.

Below, the embodiments are described in detail in cooperation with the drawings to make easily understood the technical contents, characteristics and accomplishments of the present invention.

DETAILED DESCRIPTION OF THE INVENTION

In order to make the description of the present disclosure more detailed and complete, the following provides an illustrative description for the implementation aspects and specific embodiments of the present invention; but this is not the only way to implement or use specific embodiments of the present invention. The implementation manners cover the characteristics of a number of specific embodiments and the steps and sequences of the method used to construct and operate these specific embodiments. However, other specific embodiments can also be used to achieve the same or equal functions and sequence of steps.

The present invention provides a method of configuring a private branch exchange remotely, which remotely configures a private branch exchange without limiting the location of a user. In addition, the method of the present invention is applied to private branch exchanges managed by different enterprises or organizations. The present invention does not limit a local private branch exchange and a remote private branch exchange of the same enterprise or organization and limit a local private branch exchange and a remote private branch exchange manufactured by the same manufacturer.

Figure 1:
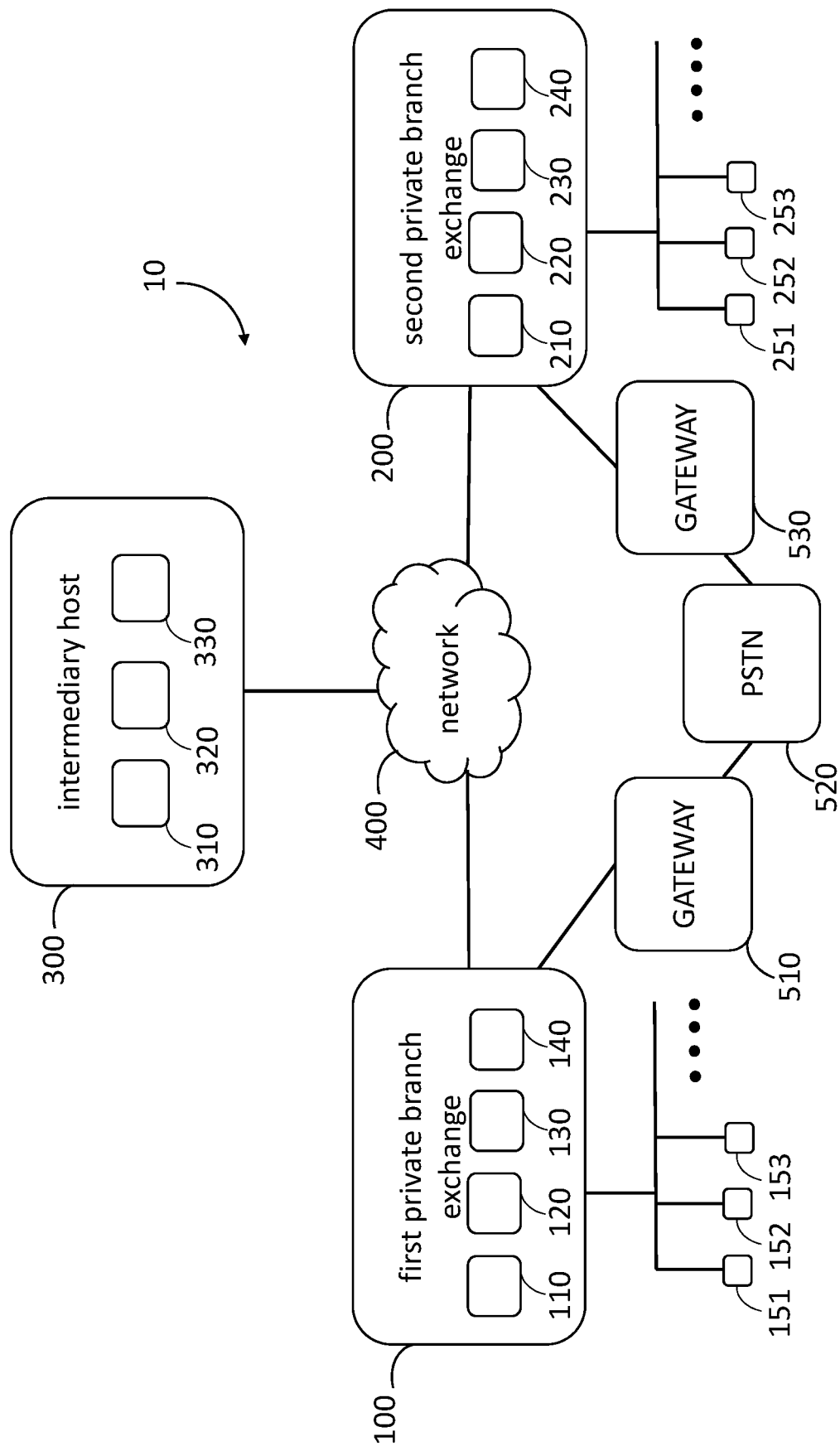
FIG. 1 is a schematic diagram illustrating a system for configuring a private branch exchange remotely according to a preferred embodiment of the present invention.

FIG. 1 is a schematic diagram illustrating a system for configuring a private branch exchange remotely according to a preferred embodiment of the present invention. Referring to FIG. 1, a system 10 includes a first private branch exchange 100, a second private branch exchange 200, and an intermediary host 300. The first private branch exchange 100 is connected to a plurality of callable devices 151, 152, 153, etc. The second private branch exchange 200 is connected to a plurality of callable devices 251, 252, 253, etc. The callable devices may be desktop phones or smart phones. The first private branch exchange 100, the second private branch exchange 200, and the intermediary host 300 are connected via an Internet network 400. The first private branch exchange 100 is connected to the second private branch exchange 200 via the Internet network 400 as a first transmission path. Alternatively, the first private branch exchange 100 is connected to the second private branch exchange 200 via a second transmission path formed by connecting a gateway 510, a public switched telephone network (PSTN) 520, and a gateway 530. The intermediary host 300 is used as a third-party device trusted by the first private branch exchange 100 and the second private branch exchange 200. As a result, the first private branch exchange 100 and the second private branch exchange 200 may obtain each other's data through the intermediary host 300 to establish a connection, and then perform the configuration desired by the user.

The first private branch exchange 100 includes a configuration module 110, a verification module 120, a storage module 130, and a message module 140, but the present invention is not limited thereto. According to configuration data, the configuration module 110 is used to configure the private branch exchange configuration of the first private branch exchange 100, such as call transfer, call restriction, line switching, etc. According to the configuration data, the configuration module 110 is used to configure the private branch exchange service of the first private branch exchange 100, such as a do-not-disturb function, an answering machine function, a dialing function for outside lines, a given dialing routing function for outside lines (via the network 400 or the PSTN 520), etc. Some embodiments of the present invention exemplify call transfer between the callable device 151 connected to the first private branch exchange 100 and the callable device 251 connected to the second private branch exchange 200, the answering machine function of the callable device 251 connected to the second private branch exchange 200 and configured by the callable device 151 connected to the first private branch exchange 100, the do-not-disturb function of the callable device 251 connected to the second private branch exchange 200 and configured by the callable device 151 connected to the first private branch exchange 100, or the dialing routing function for outside lines of the callable device 251 connected to the second private branch exchange 200 and configured by the callable device 151 connected to the first private branch exchange 100.

Besides, in order to enable the configuration data to be interpreted by the private branch exchanges manufactured by different manufacturers and configure the private branch exchanges with the configuration data, the software or hardware of the configuration module 110 of the present invention converts the configuration data into first configuration data for configuring the first private branch exchange 100 according to a first configuration data format corresponding to the first private branch exchange 100. The generation and content of the configuration data will be further explained in the following description. In order to improve the security of the connection, the configuration module 110 can also have a time-limited setting function. If the first private branch exchange 100 and the second private branch exchange 200 fail to complete the configuration within a specific time limit (e.g., two minutes), the configuration is automatically terminated and restored to the state before activating the configuration.

The verification module 120 is used to perform necessary encryption on transmission data. The present invention does not limit a specific encryption method. The verification module 120 can also generate and check verification data, thereby verifying that the first private branch exchange 100 and the second private branch exchange 200 are correct connecting objects before establishing a connection between the first private branch exchange 100 and the second private branch exchange 200. The verification process will be further explained later.

The storage module 130 is used to store extension data, user data, the data of the first private branch exchange 100, given voice data, etc. The extension data include extension numbers and the configuration of the extension (e.g., dialing for outside lines, dialing for international phone calls, do-not-disturb, etc.), identification codes of extensions, etc. The user data includes user names, user passwords, user permissions (e.g., dialing for outside lines, dialing for international phone calls, do-not-disturb, etc.), etc. The data of the first private branch exchange 100 include the identification code of the first private branch exchange, the domain name of the first private branch exchange, the state data of the first private branch exchange, the configuration and service list of the first private branch exchange, etc. The given voice data can include voice hinting data such as "Setup completed", "Set time will end in one minute", etc. It should be understood that the storage module 130 of the present invention is not limited to storing the foregoing data. The state data of the first private branch exchange may record a fact that the first private branch exchange is in an online or offline state. The configuration and service list of the first private branch exchange record the configuration and service that can be provided by the first private branch exchange.

The message module 140 is used to send data to the outside of the first private branch exchange 100 or to receive data from the outside, such as receiving the configuration data from the callable devices 151, 152, 153, sending a part of the configuration data to the intermediary host 300, receiving the data of the second private branch exchange 200 from the intermediate host 300, receiving the verification data from the second private branch exchange 200, sending the verification data and configuration data to the second private branch exchange 200, etc., but the present invention is not limited to thereto.

The system 10 also includes a plurality of callable devices 151, 152, 153, etc., which are connected to the first private branch exchange 100 in a wired or wireless way. The callable devices 151, 152, and 153 can be desktop phones or smart phones. The callable devices 151, 152, and 153 can generate configuration data in response to user operations. For example, the user presses the keys of a desktop phone or the keyboard of a smart phone to generate the configuration data, or the user operates the user interface of a smart phone to generate the configuration data. The configuration data may include, but not limited to, one of the configuration code of the private branch exchange configuration, the service code of the private branch exchange service, the identification code of the first private branch exchange 100, the identification code of the callable device connected to the first private branch exchange 100, user data, the identification code of the second private branch exchange 200, and the identification code of the callable device connected to the second private branch exchange 200, or a combination of these.

The configuration module 210, the verification module 220, the storage module 230, and the message module 240 of the second private branch exchange 200 may respectively refer to the configuration module 110, the verification module 120, and the storage module 130, and the message module 140 of the first private branch exchange 100 so will not be reiterated. The description of the plurality of callable devices 251, 252, 253, etc., which are connected to the second private branch exchange 200 in a wired or wireless way, can also refer to the description of the plurality of callable devices 151, 152, 153, etc. of the first private branch exchange 100 so will not be reiterated.

The intermediate host 300 includes a verification module 310, a storage module 320, and a message module 330, but the present invention is not limited to thereto. The verification module 310 can perform necessary encryption on the transmitted data, but the present invention is not limited to the encryption method. The verification module 310 can also check whether the first private branch exchange 100 and the second private branch exchange 200 meet the qualifications for remotely configuring private branch exchange, etc. For example, the verification module 310 queries the storage module 320 about the records of the data of the first private branch exchange 100 and the second private branch exchange 200.

The storage module 320 can store the data of the first private branch exchange 100 and the second private branch exchange 200, but the present invention is not limited to thereto. The data of the first private branch exchange 100 include, but not limited to, the identification code of the first private branch exchange, the domain name of the first private branch exchange, the state data of the first private branch exchange, and the configuration and service list of the first private branch exchange. The data of the second private branch exchange 200 include, but not limited to, the identification code of the second private branch exchange, the domain name of the second private branch exchange, the state data of the second private branch exchange, and the configuration and service list of the second private branch exchange.

The message module 330 is used to transmit data to the first private branch exchange 100 or the second private branch exchange 200, or to receive data from the first private branch exchange 100 or the second private branch exchange 200. For example, the message module 330 is used to receive the data of the first private branch exchange 100 from the first private branch exchange 100, receive the data of the second private branch exchange 200 from the second private branch exchange 200, transmit the data of the second private branch exchange 200 to the first private branch exchange 100, transmit the data of the first private branch exchange 100 to the second private branch exchange 200, receive the verification data generated by the second private branch exchange 200, or transmit the verification data generated by the second private branch exchange 200 to the first private branch exchange 100. It should be understood that the present invention is not limited to the operation of the message module 330.

Figure 2:
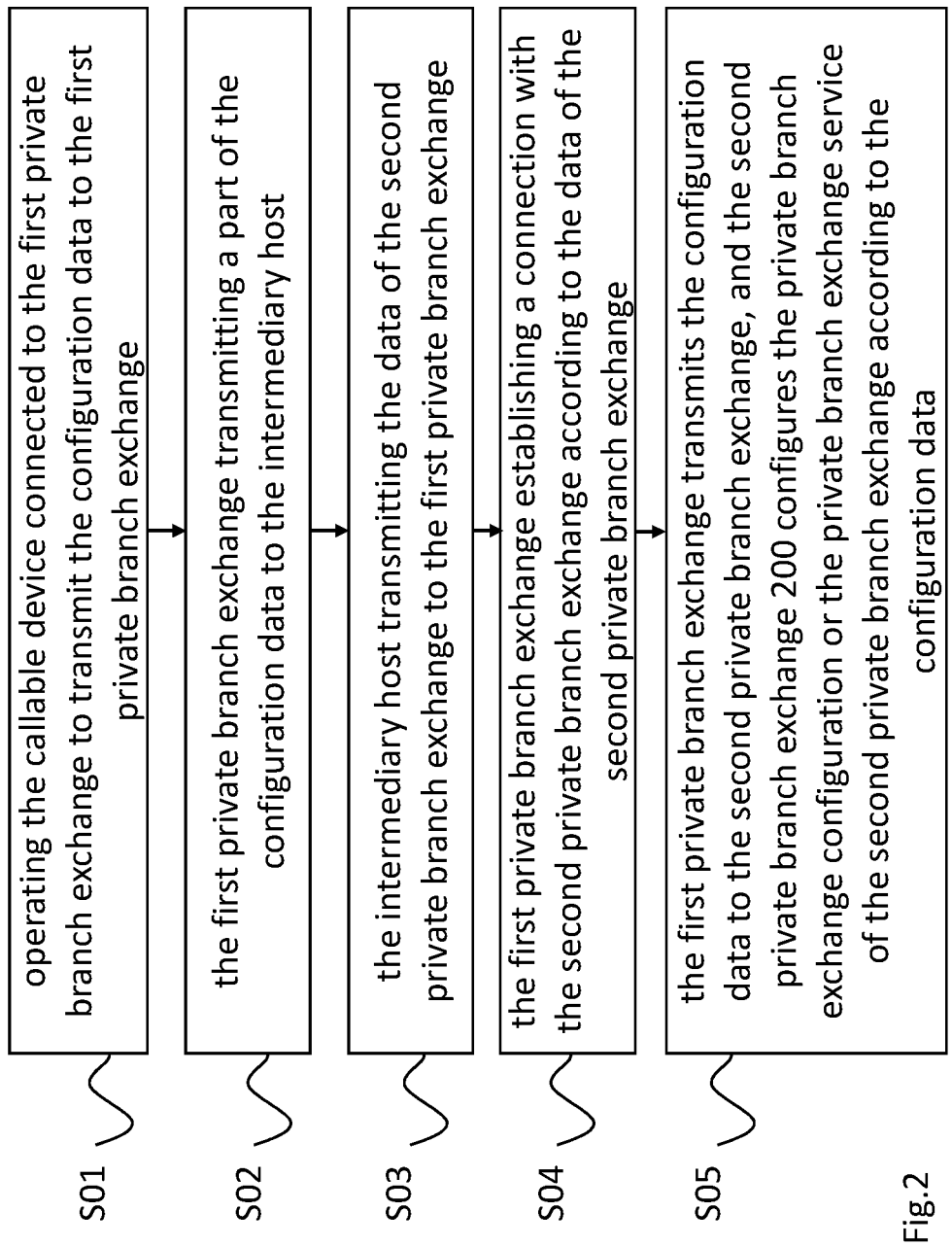
FIG. 2 is a flowchart of a method of configuring a private branch exchange remotely according to a preferred embodiment of the present invention.

FIG. 2 is a flowchart of a method of configuring a private branch exchange remotely according to a preferred embodiment of the present invention. Referring to FIG. 1 and FIG. 2, the flowchart is introduced as follows. In Step S01, the user operates the callable device 151 connected to the first private branch exchange 100 of the system 10 to transmit the configuration data to the first private branch exchange 100. The callable device 151 may be a desktop phone or a smart phone. For example, the user presses the keys of a desktop phone or the keyboard of a smart phone to generate the configuration data, or the user operates the user interface of a smart phone to generate the configuration data. The configuration data may include, but not limited to, one of the configuration code of the private branch exchange configuration, the service code of the private branch exchange service, the identification code of the first private branch exchange 100, the identification code of the callable device connected to the first private branch exchange 100, user data, the identification code of the second private branch exchange 200, and the identification code of the callable device connected to the second private branch exchange 200, or a combination of these.

In Step S02, the first private branch exchange 100 transmits a part of the configuration data to the intermediary host 300. Wherein, the message module 140 of the first private branch exchange 10 transmits a part of the configuration data to the intermediary host 300. As mentioned above, the configuration data include, but not limited to, one of the configuration code of the private branch exchange configuration, the service code of the private branch exchange service, the identification code of the first private branch exchange 100, the identification code of the callable device connected to the first private branch exchange 100, user data, the identification code of the second private branch exchange 200, and the identification code of the callable device connected to the second private branch exchange 200, or a combination of these. In different embodiments of the present invention, the first private branch exchange 100 can upload different levels of the configuration data to the intermediary host 300. The more the uploaded data, the more content the intermediary host 300 can determine in advance. The amount of the determined content will be detailed in Step S03. The configuration data uploaded by the first private branch exchange 100 may include only the identification codes of the first private branch exchange 100 and the second private branch exchange 200, or only the identification codes of the first private branch exchange 100 and the second private branch exchange 200 and the service code of the private branch exchange service, but the present invention is not limited thereto.

In Step S03, the intermediary host 300 transmits the data of the second private branch exchange 200 to the first private branch exchange 100. Wherein, after the message module 330 of the intermediate host 300 receives the configuration data, the verification module 310 can determine whether the configuration data correspond to the data in the storage module 320, thereby verifying whether the queries of the first private branch exchange 100 are legal. For example, only when the verification module 310 determines that the identification code of the first private branch exchange 100 of the configuration data corresponds to the identification code of the first private branch exchange 100 among the data of the first private branch exchange 100 in the storage module 320, the data of the second private branch exchange are allowed to be provided. In addition, when the message module 330 receives more configuration data, the more content can be determined in advance. For example, the configuration data contains the identification code of the second private branch exchange 200. Only when the verification module 310 determines that the identification code of the second private branch exchange 200 corresponds to the identification code of the second private branch exchange 200 among the data of the second private branch exchange 200 in the storage module 320, the message module 330 is allowed to provide the data of the second private branch exchange 200 for the first private branch exchange 100, where the data of the second private branch exchange 200 include the domain name of the second private branch exchange 200. Assume that the configuration data include the identification code of the second private branch exchange 200 and the service code of the private branch exchange service for configuring the "do-not-disturb" service of the callable device 251 connected to the second private branch exchange 200. In addition to comparing the identification code, the verification module 310 can also compare the configuration and service list of the second private branch exchange among the data of the second private branch exchange in the storage module 320. When the configuration and service list of the second private branch exchange include the "do-not-disturb" service, the message module 330 will provide the data of the second private branch exchange 200 for the first private branch exchange 100. However, when the configuration and service list of the second private branch exchange 200 does not include the "do-not-disturb" service, the second private branch exchange 200 cannot configure the "do-not-disturb" service. Thus, the message module 330 can send a rejection message to the first private branch exchange 100 to serve as a notification, and terminate the subsequent procedures.

In Step S04, the first private branch exchange 100 establishes a connection with the second private branch exchange 200 according to the data of the second private branch exchange 200. Because the data of the second private branch exchange 200 at least include the domain name of the second private branch exchange 200, the message module 140 of the first private branch exchange 100 can be connected to the message module 240 of the second private branch exchange 200 via the Internet 400. In addition, in order to establish a more secure connection, Step S04 further includes the following operations in an embodiment of the present invention. In Step S04, the message module 330 of the intermediate host 300 transmits the data of the first private branch exchange 100 to the second private branch exchange 200, the message module 240 of the second private branch exchange 200 sends the verification data to the message module 330 of the intermediary host 300, the message module 330 of the intermediary host 300 sends the verification data to the message module 140 of the first private branch exchange 100, and the message module 140 of the first private branch exchange 100 transmits the verification data to the message module 240 of the second private branch exchange 200 such that the second private branch exchange 200 determines whether to establish a connection. In another embodiment of the present invention, Step S04 uses the method of establishing a secure connection. In Step S04, the message module 330 of the intermediate host 300 transmits the data of the first private branch exchange 100 to the second private branch exchange 200, the message module 240 of the second private branch exchange 200 transmits the verification data to the message module 140 of the first private branch exchange 100, the message module 140 of the first private branch exchange 100 transmits the verification data to the message module 240 of the second private branch exchange 200, such that the second private branch exchange 200 determines whether to establish a connection.

In Step S05, the first private branch exchange 100 transmits the configuration data to the second private branch exchange 200, and the second private branch exchange 200 configures the private branch exchange configuration or the private branch exchange service of the second private branch exchange 200 according to the configuration data. Wherein, the message module 140 of the first private branch exchange 100 transmits the configuration data to the message module 240 of the second private branch exchange 200. The configuration module 210 of the second private branch exchange 200 determines that the user is legal according to the configuration data. For example, the user data of the configuration data correspond to the user data in the storage unit 230. Then, the private branch exchange configuration or the private branch exchange service of the second private branch exchange 200 are configured, such as call transfer, call restriction, line switching, do-not-disturb, a voice answering machine function, dialing for outside lines, a preset dialing routing function for outside lines, etc. The configuration module 210 configures the second private branch exchange 200. In some embodiments, in order to configure the specific private branch exchange configuration or the private branch exchange service, the configuration module 110 of the first private branch exchange 100 also configures the private branch exchange configuration or the private branch exchange service of the first private branch exchange 100 according to the configuration data. For example, when a user desires to transfer an incoming call received by the callable device 251 connected to the second private branch exchange 200 to the callable device 151 connected to the first private branch exchange 100 for answering, the configuration module 110 of the first private branch exchange 100 and the configuration module 210 of the second private branch exchange 200 both need to be configured according to the configuration data. In Step S05, the preset voice data is played to notify the user after the configuration is completed. For example, after the configuration of the second private branch exchange 200 is completed, the message module 240 transmits the voice data "You have completed the configuration" in the storage module 230 to the callable device 151 of the first private branch exchange 100. The voice data are played on the callable device 151 of the first private branch exchange 100 to notify the user that the configuration has been completed.

As mentioned above, in order to enable the configuration data to be interpreted by the private branch exchanges manufactured by different manufacturers and configure the private branch exchanges with the configuration data, the software or hardware of the configuration module 110 in Step S05 converts the configuration data into first configuration data for configuring the first private branch exchange 100 according to a first configuration data format corresponding to the first private branch exchange 100. Similarly, the configuration module 210 of the second private branch exchange 200 performs the same process to convert the configuration data into second configuration data for configuring the second private branch exchange 200. In order to improve the security of the connection, the configuration modules 110 and 210 can also have a time-limited setting function. If the first private branch exchange 100 and the second private branch exchange 200 fail to complete the configuration within a specific time limit, the configuration is automatically terminated and restored to the state before activating the configuration.

According to the forgoing embodiments, it is understood that the present invention provides a method of configuring a private branch exchange remotely, which remotely configures a private branch exchange without limiting the location of a user. In addition, the method of the present invention is applied to private branch exchanges managed by different enterprises or organizations. The present invention does not limit a local private branch exchange and a remote private branch exchange of the same enterprise or organization and limit a local private branch exchange and a remote private branch exchange manufactured by the same manufacturer.

Although various examples of the disclosed technology have been described above, it should be understood that these examples have been presented by examples rather than limited. Likewise, various drawings may depict example architectures or other configurations of the disclosed technology. The drawings may be depicted to assist in understanding the features and functionality that may be included in the disclosed technology. The disclosed technology is not limited to the illustrated example architectures or configurations, but the desired features can be implemented using a variety of alternative architectures and configurations. In fact, it will be obvious to those skilled in the art to know how to implement alternative functionalities, logical or physical partitions and configurations to implement the required features of the technology disclosed in this article. In addition, with regard to flowcharts, operation descriptions, and methodological technical solutions, the order in which the steps are presented herein should not require that the disclosed technologies be implemented in the same order to perform the listed functionality, unless the context dictates otherwise.

What is claimed is:

1. A method of configuring a private branch exchange remotely, which is employed in an environment of an intermediary host, a first private branch exchange, and a second private branch exchange, the first private branch exchange connected to callable devices, the second private branch exchange connected to callable devices, and the method comprising:
   (A) by the callable device connected to the first private branch exchange, transmitting configuration data to the first private branch exchange;
   (B) by the first private branch exchange, transmitting a part of the configuration data to the intermediary host;
   (C) by the intermediary host, transmitting data of the second private branch exchange to the first private branch exchange;
   (D) by the first private branch exchange, connecting to the second private branch exchange according to the data of the second private branch exchange; and
   (E) by the first private branch exchange, transmitting the configuration data to the second private branch exchange, wherein the second private branch exchange configures private branch exchange configuration or a private branch exchange service of the second private branch exchange according to the configuration data.

2. The method of configuring a private branch exchange remotely according to claim 1, wherein in operation (E), the first private branch exchange configures private branch exchange configuration or a private branch exchange service of the first private branch exchange according to the configuration data.

3. The method of configuring a private branch exchange remotely according to claim 1, wherein the configuration data include one of a configuration code of the private branch exchange configuration, a service code of the private branch exchange service, an identification code of the first private branch exchange, an identification code of the callable device connected to the first private branch exchange, user data, an identification code of the second private branch exchange, and an identification code of the callable device connected to the second private branch exchange, or a combination of these.

4. The method of configuring a private branch exchange remotely according to claim 1, wherein the callable devices connected to the first private branch exchange are desktop telephones or smart phones.

5. The method of configuring a private branch exchange remotely according to claim 1, wherein the data of the second private branch exchange includes an identification code, a domain name, state data, a configuration and service list, or a combination of these.

6. The method of configuring a private branch exchange remotely according to claim 1, wherein in operation (E), the first private branch exchange converts the configuration data into first configuration data for configuring the first private branch exchange according to a first configuration data format corresponding to the first private branch exchange.

7. The method of configuring a private branch exchange remotely according to claim 1, wherein the first private branch exchange and the second private branch exchange are manufactured by different manufacturers.

8. The method of configuring a private branch exchange remotely according to claim 1, wherein in operation (E), the second private branch exchange converts the configuration data into second configuration data for configuring the second private branch exchange according to a second configuration data format corresponding to the second private branch exchange.

9. The method of configuring a private branch exchange remotely according to claim 1, wherein in operation (A), the callable device connected to the first private branch exchange provides a user interface, and a user uses the user interface to generate the configuration data.

10. The method of configuring a private branch exchange remotely according to claim 1, wherein the private branch exchange configuration or the private branch exchange service includes call transfer, call restriction, line switching, call transfer between the callable device connected to the first private branch exchange and the callable device connected to the second private branch exchange, an answering machine function of the callable device connected to the second private branch exchange and configured by the callable device connected to the first private branch exchange, a do-not-disturb function of the callable device connected to the second private branch exchange and configured by the callable device connected to the first private branch exchange, or a dialing routing function for outside lines of the callable device of the second private branch exchange and configured by the callable device connected to the first private branch exchange.

11. The method of configuring a private branch exchange remotely according to claim 1, wherein in operation (D), the intermediary host transmits data of the first private branch exchange to the second private branch exchange, the second private branch exchange transmits verification data to the intermediary host, the intermediary host transmits the verification data to the first private branch exchange, and the first private branch exchange transmits the verification data to the second private branch exchange for determining whether to establish a connection.

12. The method of configuring a private branch exchange remotely according to claim 1, wherein in operation (D), the intermediary host transmits data of the first private branch exchange to the second private branch exchange, the second private branch exchange transmits verification data to the first private branch exchange, and the first private branch exchange transmits the verification data to the second private branch exchange for determining whether to establish a connection.

13. The method of configuring a private branch exchange remotely according to claim 1, wherein in operation (E), the first private branch exchange or the second private branch exchange sets a time limit, the first private branch exchange and the second private branch exchange complete configuration of the second private branch exchange within the time limit, and the configuration is automatically terminated when the time limit is exceeded.

* * * * *